E. G. WHITACRE.
DRIVING GEAR FOR AUTOMOBILES.
APPLICATION FILED MAY 8, 1909.
939,116.
Patented Nov. 2, 1909.
2 SHEETS—SHEET 1.
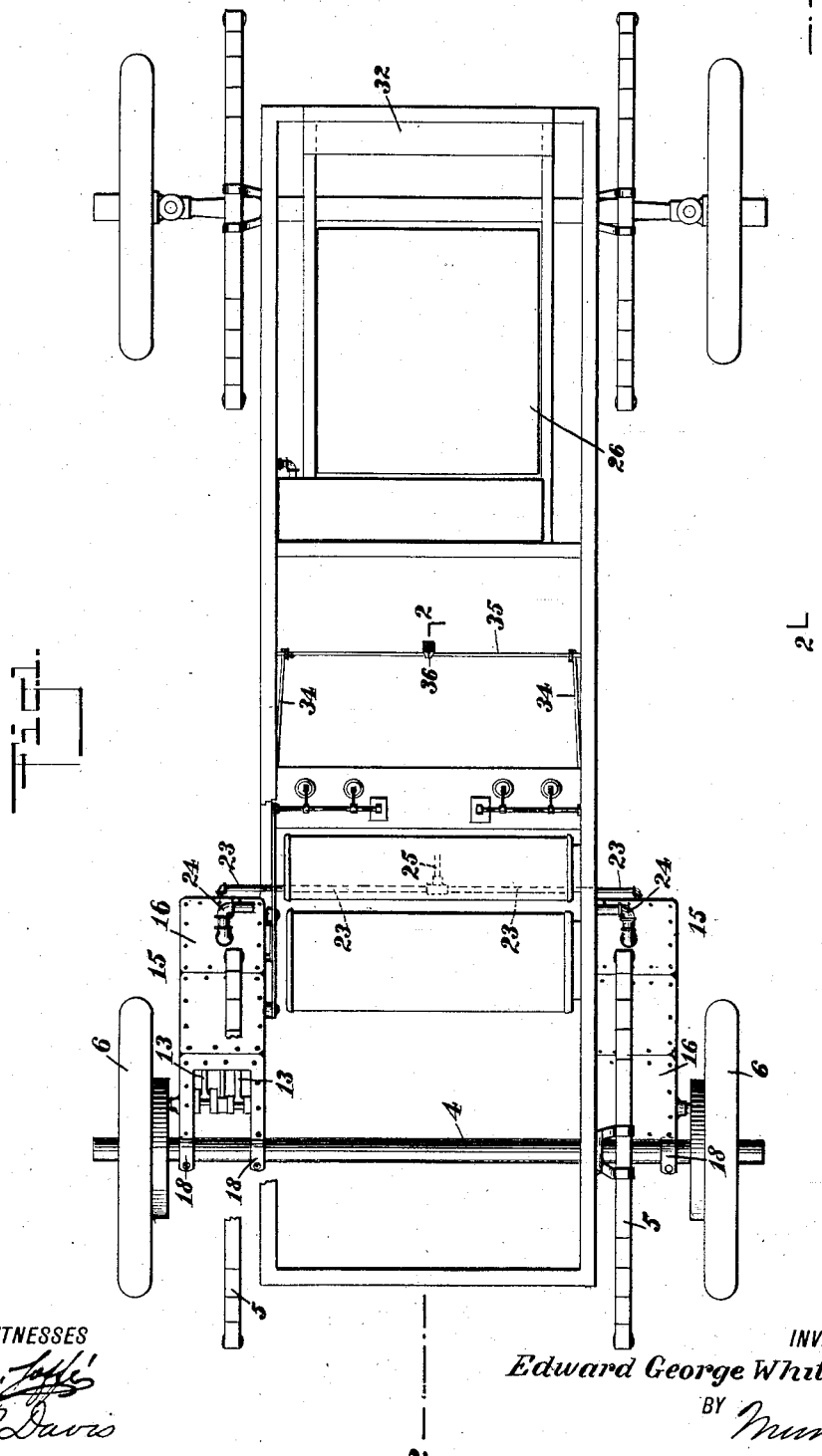
WITNESSES
INVENTOR
Edward George Whitacre.
BY
ATTORNEYS

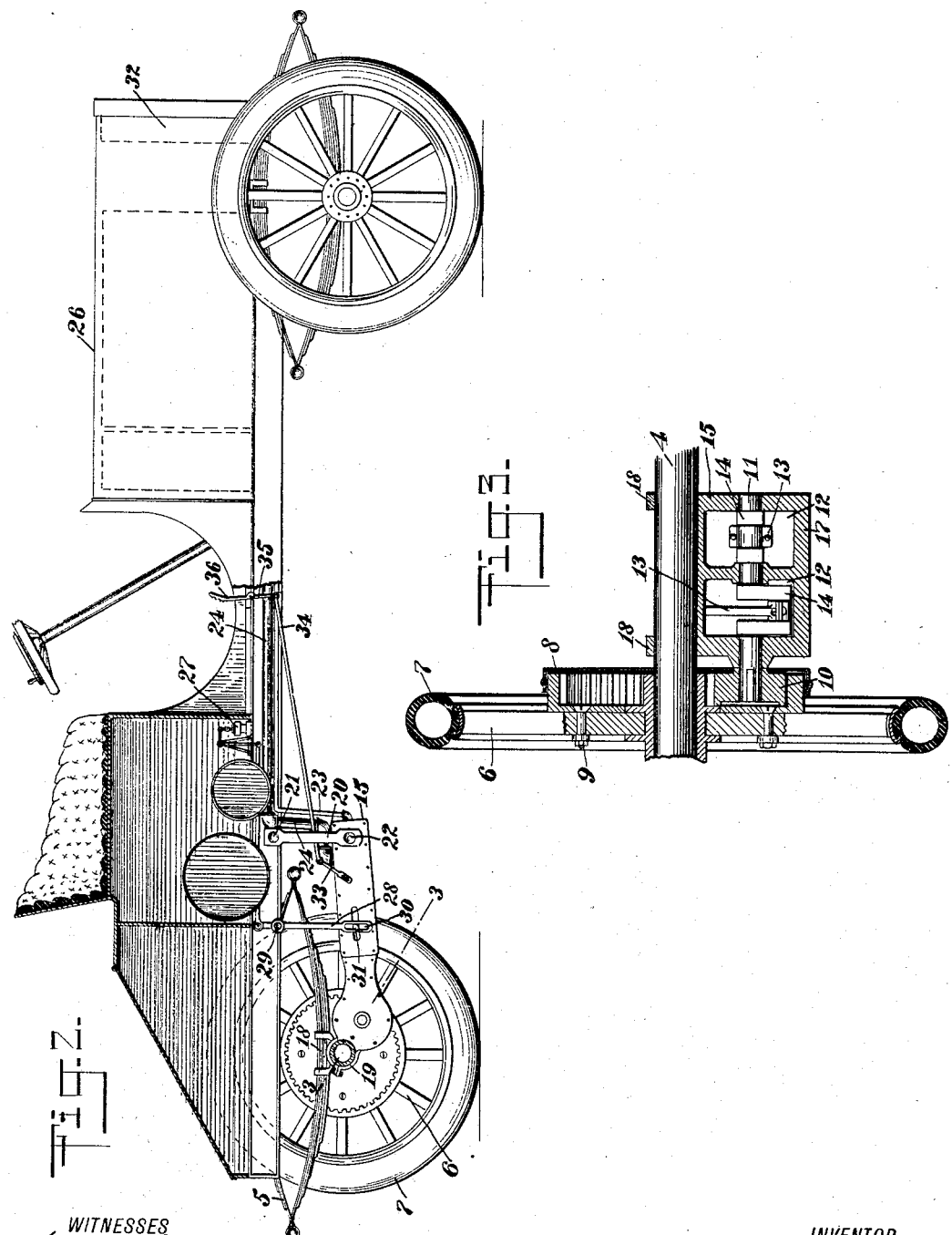

UNITED STATES PATENT OFFICE.

EDWARD GEORGE WHITACRE, OF WELLSVILLE, OHIO.

DRIVING-GEAR FOR AUTOMOBILES.

939,116.  Specification of Letters Patent.  Patented Nov. 2, 1909.

Application filed May 8, 1909. Serial No. 494,829.

*To all whom it may concern:*

Be it known that I, EDWARD GEORGE WHITACRE, a citizen of the United States, and a resident of Wellsville, in the county of Columbiana and State of Ohio, have invented a certain new and useful Driving-Gear for Automobiles, of which the following is a full, clear, and exact description.

The principal objects which the present invention has in view are: to provide a driving mechanism which may be independently attached to the driving wheels of the automobile; to avoid the necessity for using differential gears in the driving axle; to provide a straight, rigid axle for vehicles of the character described; to provide automatic means for compensating the difference in speed between the two driving wheels while moving in a curved path; to automatically by-pass and graduate the motive power as applied to the two wheels; to house the moving parts so that the same are protected against admission of dust or dirt; to hang the engines upon the spring body to cushion the vibration of the travel of the car; to maintain constant the relation of the driving and driven members; and to simplify the construction of the various instrumentalities comprising the present mechanism.

One embodiment of the present invention is shown in the accompanying drawings, wherein like characters of reference indicate corresponding parts in all the views.

Figure 1 is a plan view of an automobile chassis showing the location of the engines and fuel and water tanks; Fig. 2 is a longitudinal vertical section taken on the line 2—2 in Fig. 1; and Fig. 3 is an enlarged detail view in vertical cross section, taken on the line 3—3 in Fig. 2, showing one of the driving wheels and the power transmission connection therewith, the driving axle appearing in full lines.

The present invention, as above stated, relates more particularly to the mounting for the driving engines used in automobiles. The style of engine may vary; that shown in the drawings is of the character known as steam engines, but any form of engine wherein the motive power is a gas under pressure will serve. In the form of engine known as the internal combustion engine, the present construction might be used, provided any of the well known relief valves were employed in conjunction with one or the other of the engines, which would be operated automatically as the automobile is driven in a curved path. The purpose of the relief valve would be to lessen the power stroke on the engine on the inner side of the curved path being followed by the automobile.

In the drawings, the numeral 4 indicates the rear axle of the vehicle, said axle being rigidly mounted upon springs 5—5. The driving wheels 6—6 are rotatably mounted on the said axle 4, and are provided with any suitable tire 7 and have rigidly secured to the spokes and hub of the wheel an internal gear 8 of any suitable dimension, and secured to the spokes of the wheels 6 by means of bolts 9. The open face of the gear may be covered by any suitable form of casing, the edges of which are packed dust-proof. The casing is, of course, stationary, and the internal gear rotates within the same. Meshed with the teeth of the gear 8 is a pinion 10, which is fixedly mounted upon the driving crank shaft 11 of the engine, which shaft is mounted in shaft races 12—12 and is supported in the frame of the engine as shown in Fig. 3 of the drawings.

The races 12—12 are elongated to provide for the movement of piston rods 13—13, which are secured on the crank pins of cranks 14—14, which are suitably connected with any desired form of steam engine; that shown in the drawings being indicated as a compound engine, operating the two piston rods 13—13 on the double crank shaft 11. As is usual in this form of engine, one of the cylinders is compound. The engine and races 12—12 are contained within a casing 15, formed of close fitting plates, bolted to side frames to form, when assembled, a rectangular dust-proof chamber as shown in the drawings on the lower side of Fig. 1, and in Fig. 2.

From the casing 15 are extended clip brackets 18 and 19, to fit closely around the axle 4. The clip brackets are bolted in position upon the said axle in such manner as to form a hinge from the swing of the casing 15 and the engines supported therein.

The casing 15 being supported by the hinged construction engaging the axle 4 just above described, the forward end is mounted by means of hangers 20 which are bolted to the side rail of the chassis at 21 and to the side of the casing 15 at 22, as shown in the drawings. The joints 21 and 22 are preferably formed as universal joints, to accommodate any sway or lateral vibration on the part of the body of the vehicle which does not agree with the alinement of the axle 4; in other words, the swinging connections are such that the attachment of the casing 15 to the axle 4 is positive and paramount.

Steam pipes 23—23 are connected to the casing 15 by ball-jointed unions, so that they will accommodate any rise and fall on the part of the casing 15, and the same is true of the water circulating pipes 24. The pipes 23—23 are brought together and joined to a main supply pipe 25, which leads forward to the boiler or source of power located under a bonnet 26. The water circulating pipes 24 may be likewise joined to a common member, though this is not imperative as the said pipes do not perform the same functions as are performed by the steam pipes 23—23.

When, in the operation of the engines on both sides of the vehicle, the vehicle is driven around a curve and it becomes desirable that the wheel on the inside of the curve should move slower, and that the wheel on the outside should move proportionately faster relatively than the body speed, the conditions necessary to such accommodation on the part of the two wheels, is brought about by means of the connection of the pipes 23—23 to the main supply pipe 25. The resistance on the part of the engine connected to the wheel on the inside of the curve which is slowed in its action, produces an added resistance to the entering steam, while on the opposite side of the vehicle the acceleration of the wheel on the outside of the curve eases up on the engine, thereby materially reducing the engine resistance. The result of the increasing resistance on the one side and the decreasing resistance on the other, is that the steam delivered by the supply pipe 25 follows the line of least resistance, or, to speak more plainly, accommodates itself to the varying condition in the two engines, supplying less steam to the slowly moving and more to the accelerated engine; this action is automatic and in exact proportion to the demands.

A water circulation pump 27 is suitably connected through a plurality of levers with a rocking arm 28, which is pivotally mounted at 29 on the side rail of the chassis. At the lower end of the rocking arm 28 there is formed a slot 30, in which is mounted a pin 31 extended from the piston rod or cross head, as the case may be. It is by means of this connection that the pump 27 is actuated to maintain the rapid circulation of water contained in the water tanks. By means of the connection wherein is utilized the slotted end 30 of the rocking arm 28, there is accommodated a rise and fall on the part of the engines contained in the casings 15.

The water circulating pipes 24 are extended forward to radiators 32, mounted in the forward end of the automobile, in the construction illustrated in the present drawings.

Throttle rods 33 are extended through the casings 15 and suitably attached to the engines contained in the said casings. The rods 33 are connected by means of connecting rods 34 to a cross rod 35, which in turn is secured in the lower end of the lower arm of a foot-actuated lever 36, located in the body of the car, and in position to receive the foot of the chauffeur. By means of the connecting rods 34—34 the variation in the movement of the chassis and the suspended engines is absorbed.

When constructed as above described and as shown in the drawings, the operation of driving a vehicle is in every respect similar to that at present employed, for vehicles where the engines and moving parts are connected primarily with a driving shaft which is connected with a two-piece axle provided with a differential gear connection.

By constructing a vehicle as herein described, the mechanism is simplified both in structural features and in operative possibilities. The adjustment of the two engines to varying needs, is simpler in the construction herein described than in the ordinary constructions of the present day; the rigid driving shaft extension usually employed is dispensed with; and the variable speed gears used in connection with internal combustion engine drives are avoided. Further, a large proportion of the weight of the engines is carried on the driving wheels, thereby relieving the body of the vehicle, or chassis, and resulting in less swaying action on the springs.

Having thus described my invention, I claim as new, and desire to secure by Letters Patent:—

A driving gear for automobiles, comprising traction wheels rotatably mounted on the carrying axle, two reciprocating motors embodying crank shafts, two casings pivotally mounted on the axle of said traction wheels, said casings supporting said motors and forming bearings for said crank shafts, two gear wheels one of which is fixedly mounted on each of the said traction wheels, two gear pinions one of which is fixedly mounted on each of said crank shafts and engaged with one of said gear wheels mounted on said traction wheels, suspending devices for supporting said casings on the body of the vehicle, said devices being pivotally mounted upon the said vehicle and upon the said casing, a steam generator mounted upon the said body and adapted to deliver power to the said motors through a common duct whereby the unequal demands for power medium on the part of the two motors are at all times accommodated, a throttle mechanism for said motors having suitable connecting devices with the foot pedal situated conveniently to the foot of the chauffeur for controlling said motors, and a water circulating system embodying a pump operated by the said motors, an extension being passed through the said casings from the reciprocating parts of the said motors to engage an elongated vertically disposed loop in the end of a rocking lever to reciprocate the plunger of said pump.

In testimony whereof I have signed my name to this specification in the presence of two subscribing witnesses.

EDWARD GEORGE WHITACRE.

Witnesses:
 MARY E. IMBRIE,
 W. R. MACDONALD.